United States Patent
Dickson

(10) Patent No.: US 6,745,104 B1
(45) Date of Patent: Jun. 1, 2004

(54) FRAUD DETECTION THROUGH GENERAL INFERENCE

(75) Inventor: Timothy E. Dickson, Greensboro, NC (US)

(73) Assignee: Gilbarco Inc., Greensboro, NC (US)

(*) Notice: Subject to any disclaimer, the term of this patent is extended or adjusted under 35 U.S.C. 154(b) by 0 days.

(21) Appl. No.: 09/495,027

(22) Filed: Jan. 31, 2000

(51) Int. Cl.$^7$ .............. G01F 7/00; G05D 7/00; G06F 17/00

(52) U.S. Cl. ............ 700/236; 700/241; 700/283; 702/45; 702/100

(58) Field of Search .............. 700/236, 240, 700/241, 283; 702/45, 46, 100

(56) References Cited

U.S. PATENT DOCUMENTS

| | | | |
|---|---|---|---|
| 3,814,934 A | 6/1974 | Mesh et al. ............ 250/231 SE |
| 3,855,851 A | 12/1974 | Paul, Sr. ................. 73/115 |
| 4,027,708 A | 6/1977 | Hansel ................... 141/209 |
| 4,096,383 A | 6/1978 | Mancini et al. ........ 250/231 SE |
| 4,523,700 A | 6/1985 | Bower et al. ............ 222/505 |
| 4,662,539 A | 5/1987 | Komukai ................. 222/14 |
| 4,728,788 A | 3/1988 | Myers et al. .......... 250/231 SE |
| 5,319,545 A | 6/1994 | McGarvey et al. ....... 364/403 |
| 5,363,093 A | * 11/1994 | Williams et al. ........ 340/605 |
| 5,423,457 A | * 6/1995 | Nicholas et al. ........ 222/62 |
| 5,544,518 A | 8/1996 | Hart et al. .............. 73/1 H |
| 5,602,745 A | 2/1997 | Atchley et al. ......... 364/464.23 |
| 5,636,653 A | 6/1997 | Titus ..................... 137/14 |
| 5,665,895 A | 9/1997 | Hart et al. ............... 73/1.73 |
| 5,757,664 A | * 5/1998 | Rogers et al. ............ 700/232 |
| 5,790,410 A | 8/1998 | Warn et al. ............ 364/479.02 |
| 5,868,179 A | 2/1999 | Hartsell, Jr. ............ 141/198 |
| 5,923,572 A | 7/1999 | Pollock ................ 364/528.17 |
| 5,929,314 A | 7/1999 | Bergkvist et al. ......... 73/1.36 |
| 6,067,476 A | 5/2000 | Siler ..................... 700/79 |
| 6,070,156 A | 5/2000 | Hartsell, Jr. ............ 705/413 |
| 6,078,888 A | 6/2000 | Johnson, Jr. ............ 705/1 |
| 6,092,410 A | 7/2000 | Kaehler et al. .......... 73/1.34 |
| 6,092,629 A | * 7/2000 | Bohnert et al. ......... 186/53 |
| 6,109,477 A | 8/2000 | Myers et al. ............ 222/1 |
| 6,185,307 B1 | 2/2001 | Johnson, Jr. ............ 380/270 |
| 6,296,148 B1 | 10/2001 | Myers et al. ............ 222/71 |
| 6,313,737 B1 | 11/2001 | Freeze et al. ........... 340/10.1 |
| 6,381,514 B1 | 4/2002 | Hartsell, Jr. ............ 700/236 |
| 6,390,151 B1 | 5/2002 | Christman et al. ....... 141/231 |
| 6,442,448 B1 | 8/2002 | Finley et al. ............ 700/231 |
| 6,470,233 B1 | 10/2002 | Johnson, Jr. ............ 700/237 |
| 2001/0034567 A1 | * 10/2001 | Allen et al. ............ 700/283 |

OTHER PUBLICATIONS

Dickson, Timothy E., "Key/PIN Management Security in Gilbarco Products" Jun. 1998, pp. 1–6.

* cited by examiner

Primary Examiner—Leo Picard
Assistant Examiner—Elliot Frank
(74) Attorney, Agent, or Firm—Withrow & Terranova PLLC

(57) ABSTRACT

A fraud detection system within a fuel dispenser includes the ability to measure the amount of fuel dispensed through the fuel dispenser. The measurement is compared to a value independently created representing what the amount of fuel dispensed should approximate. If the values are not comparable, an alarm may be generated to indicate that the fuel dispenser has been modified to perpetrate fraud upon the customers.

58 Claims, 7 Drawing Sheets

FRAUD DETECTION THROUGH GENERAL INFERENCE

RELATED APPLICATIONS

The present application is related to the concurrently filed, commonly invented, commonly assigned application Ser. No. 09/494,825, entitled FUEL DISPENSER FRAUD DETECTION SYSTEM; application Ser. No. 09/494,897, entitled FRAUD DETECTION THROUGH FLOW RATE ANALYSIS; application Ser. No. 09/495,024, now U.S. Pat. No. 6,463,389, entitled FRAUD DETECTION THROUGH TANK MONITOR ANALYSIS; application Ser. No. 09/494,903, now U.S. Pat. No. 6,213,172, entitled FRAUD DETECTION THROUGH VAPOR RECOVERY ANALYSIS; application Ser. No. 09/494,902, now U.S. Pat. No. 6,438,452, entitled FRAUD DETECTION THROUGH TIME ANALYSIS; and application Ser. No. 09/495,022, now U.S. Pat. No. 6,421,616, entitled FRAUD DETECTION THROUGH INFERENCE, which are all hereby incorporated by reference.

BACKGROUND OF THE INVENTION

1. Field of the Invention

The present invention relates to a scheme for detecting fraudulent activity related to fuel dispensing transactions, and more particularly to a methodology designed to check independently for fraud without relying on a fuel dispensing meter by relying on an independent measurement of time required to complete a fueling transaction.

2. Description of the Related Art

Fuel dispensing transactions are a somewhat opaque process to most customers. The customer drives up, makes a fuel grade selection and dispenses fuel into a vehicle or approved container. When the fuel dispenser shuts off, the customer may check the gauge and see that he owes some amount of money for some amount of fuel dispensed. Alternatively, the customer may only have limited funds and may terminate the transaction upon reaching the budgeted amount as displayed on the face of the fuel dispenser. The financial side of the transaction is completed and the customer drives off.

Behind the scenes, the fuel dispenser is keeping careful track of the amount of fuel dispensed so that it may be reported to the customer as well as providing a running tally of how much it will cost the customer to purchase the fuel already dispensed. This is typically achieved with a flow meter and a pulser. When a known quantity of fuel has passed through the flow meter, the pulser generates a pulse. Typically, 1000 pulses are generated per gallon of fuel dispensed. The number of pulses may be processed by an internal microprocessor to arrive at an amount of fuel dispensed and a cost associated therewith. These numbers are reported to the customer to aid him in making fuel dispensing decisions.

Customers of fuel dispensers expect honest and accurate calculations of the cost of fuel actually dispensed into their vehicle and rely on the fuel dispenser display to report the correct figures. However, unscrupulous individuals may, with little effort, modify the pulser and other internal electronics within the fuel dispenser to provide inaccurate readings, in effect, artificially accelerating the perceived rate of fuel dispensing and charging the consumer for fuel that was not actually dispensed. The mechanisms normally responsible for detecting and preventing this sort of fraud are often the mechanisms that are modified or replaced in the process, completely circumventing any fraud prevention device.

Thus, there remains a need in the field of fuel dispensing to provide an method to detect fraud within fuel dispensing transactions and provide the appropriate alerts to rectify the situation.

SUMMARY OF THE INVENTION

The limitations of the prior art are addressed by providing one or more of a matrix of fraud detection schemes that attempt to verify independently of the data reported to the control system the amount of fuel dispensed. If the inferential fuel dispensing observations do not confirm expected fuel dispensing transactions, an alarm may be generated. There are several schemes that could be implemented to detect the fraud.

The first scheme would be to check the vapor recovery system and determine at what rate the vapor was being recovered. Improved monitors allow accurate determinations of how much vapor has been recovered. If the vapor recovered is not comparable to the amount of fuel allegedly dispensed, then fraud may be present. Furthermore, comparing vapor recovery rates between fuel dispensers may also provide a hint that one or more dispensers have been modified to produce fraudulent transactions.

The second scheme includes comparing flow rates between different dispensers. Depending on where the measurement is taken and where the fraud is perpetrated, the flow rate may be higher or lower in the fraudulent dispensers as compared to the nonfraudulent dispensers. However, regardless of where and how, there will be a difference for the fraudulent dispensers.

The third scheme includes measuring the time required to dispense fuel at each dispenser. If one dispenser consistently dispenses fuel at time increments different than other fuel dispensers, it may be a modified dispenser perpetrating a fraud on the unsuspecting customer.

The fourth scheme includes monitoring for increases or decreases in the flow rate at one dispenser that do not occur at other dispensers at the site. The fuel dispenser that has a different performance profile may have been modified. The changes may occur between transactions or even within a single transaction.

The fifth scheme includes using the tank monitor to evaluate how much fuel has been drawn out of the underground storage tank for a given fueling transaction. This can be compared with the amount of fuel that the fuel dispenser reports that it dispensed. If the two numbers are not comparable, then it is likely that the fuel dispenser has been modified.

Other schemes may also be possible, or the schemes presented herein could be expanded or combined so that the fuel dispenser in question is compared not only to other fuel dispensers at the fueling station, but also to some regional or national average for similar fuel dispensers. This may be particularly appropriate where it is a regional or central office that is attempting to detect the fraud and not a single fueling station.

DETAILED DESCRIPTION OF THE PREFERRED EMBODIMENTS

The present invention uses a number of different techniques to detect fraud within a fueling transaction. However, a discussion of the physical elements comprising a fuel dispensing environment will be helpful as a background against which the present fraud detection schemes are implemented.

Figure 1:
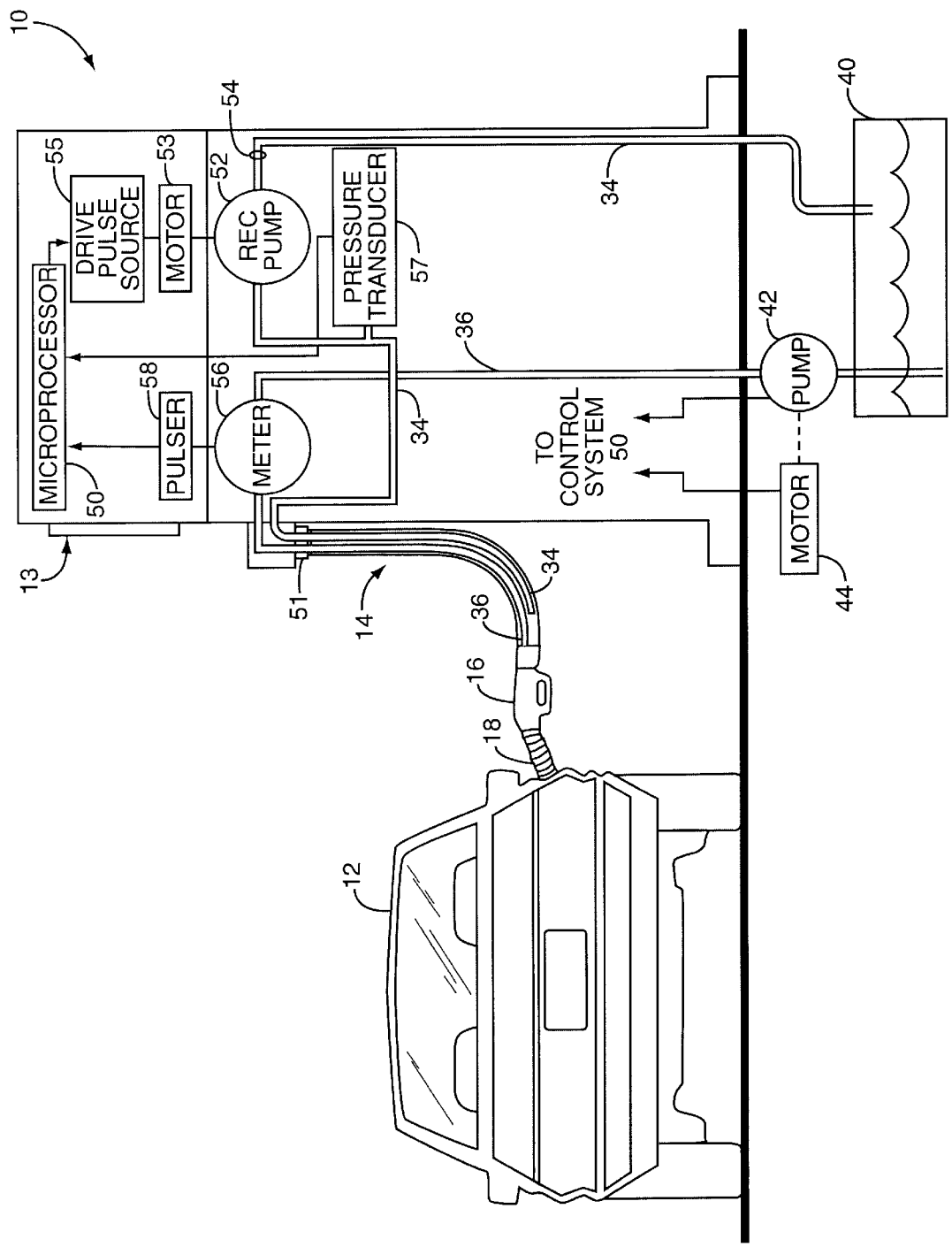
FIG. 1 is a typical fuel dispenser designed to dispense fuel from the connected underground storage tank.

Turning now to FIG. 1, a fuel dispenser 10 is adapted to deliver a fuel, such as gasoline or diesel fuel to a vehicle 12 through a delivery hose 14, and more particularly through a nozzle 16 and spout 18. The vehicle 12 includes a fill neck and a tank (not shown), which accepts the fuel and provides it through appropriate fluid connections to the engine (not shown) of the vehicle 12. A display 13 provides a user interface from which the user can determine a cost associated with a particular fueling transaction. While display 13 is preferably a visual display, it may equivalently be an audio user interface, such as might be used by the visually impaired or the like.

Flexible delivery hose 14 includes a product delivery line 36 and a vapor return line 34. Both lines 34 and 36 are fluidly connected to an underground storage tank (UST) 40 through the fuel dispenser 10. Once in the fuel dispenser 10, the lines 34 and 36 separate at split 51. Pump 42, controlled by motor 44 extracts fuel from the UST 40 and provides it to product delivery line 36. This can be done by creating a vacuum in line 36 or other equivalent means. Additionally, a single pump 42 and motor 44 may serve a plurality of fuel dispensers 10, or a single fuel dispenser 10.

A vapor recovery system is typically present in the fuel dispenser 10. During delivery of fuel into the vehicle fuel tank, the incoming fuel displaces air containing fuel vapors. Vapor is recovered from the gas tank of the vehicle 12 through the vapor return line 34 with the assistance of a vapor pump 52. A motor 53 powers the vapor pump 52. A control system 50 receives information from a meter 56 and a pulser 58 in the fuel delivery line 36. Meter 56 measures the fuel being dispensed while the pulser 58 generates a pulse per count of the meter 56. Typical pulsers 58 generate one thousand (1000) pulses per gallon of fuel dispensed. Control system 50 controls a drive pulse source 55 that in turn controls the motor 53. The control system 50 may be a microprocessor with an associated memory or the like and also operates to control the various functions of the fuel dispenser including, but not limited to: fuel transaction authorization, fuel grade selection, display and/or audio control. The vapor recovery pump 52 may be a variable speed pump or a constant speed pump with or without a controlled valve (not shown) as is well known in the art. Additionally, the pump 42 and motor 44 may be controlled by the control system 50 directly and provide operating data thereto.

Additionally, a vapor flow sensor 54 may be positioned in the vapor return line 34. Vapor flow sensor 54 may not only sense vapor flow within the vapor return line, but also sense hydrocarbon concentration to provide a total volume of hydrocarbons recovered from the gas tank of the vehicle 12. In some systems, vapor recovery is dictated by the rate of fuel dispensing, however, in systems equipped with a sensor 54, vapor recovery operates at least semi-independently of fuel dispensing.

Figure 2:
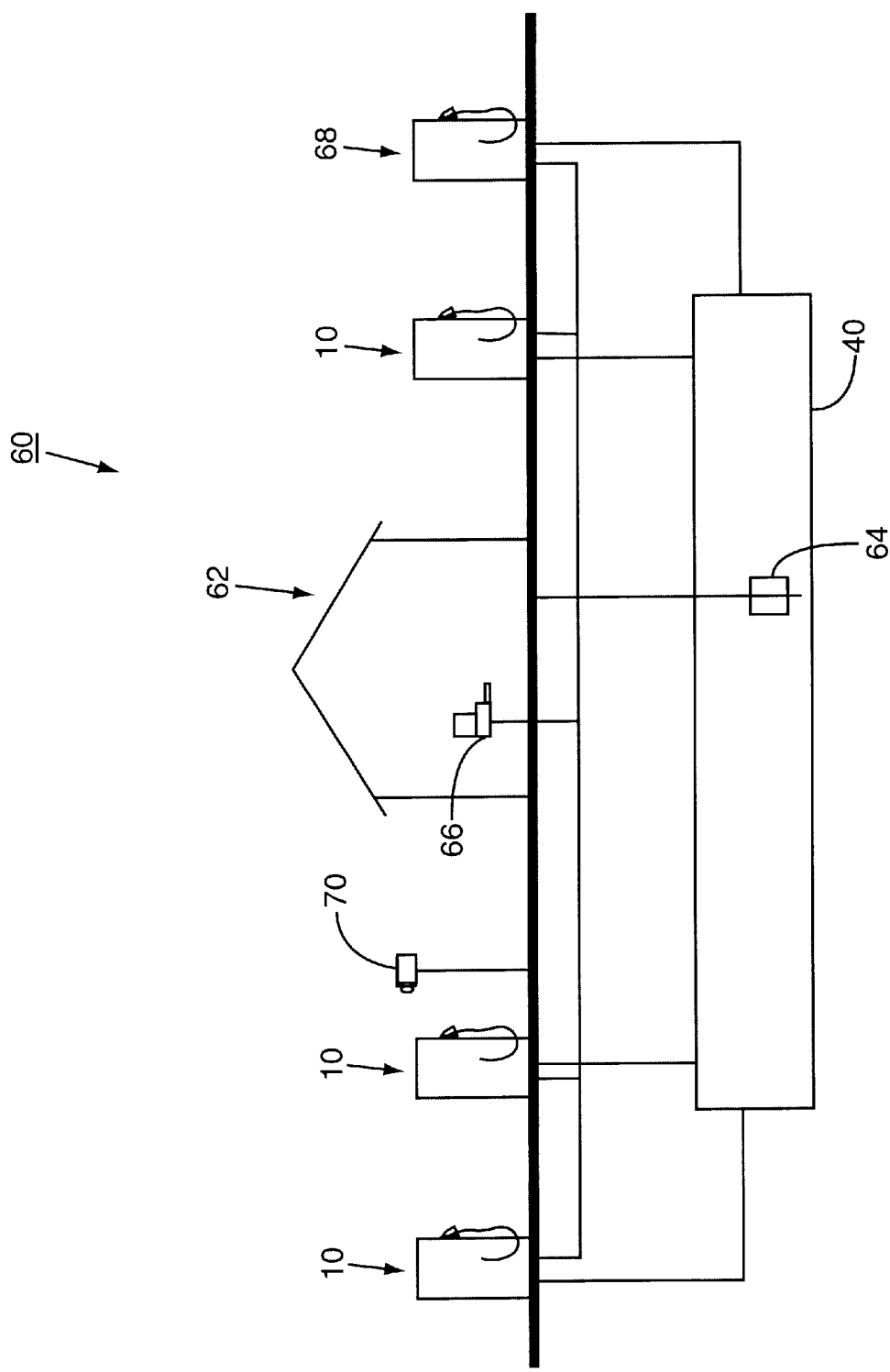
FIG. 2 is a fueling station employing the fuel dispensers of FIG. 1.

To combat fraud in the fuel dispenser 10, a number of different embodiments of the present invention are offered. These may be implemented in the fuel dispenser 10 or as shown in FIG. 2, in a central fuel station building 62 within a fueling environment 60. Fueling environment 60 includes the fuel station building 62, a plurality of fuel dispensers 10, a central station computer 66, and a potentially fraudulent dispenser 68. Dispensers 10 and 68 are fluidly connected to the UST 40, in which is positioned a UST sensor 64. UST sensor 64 measures the level of fluid within the UST 40. Such UST sensors 64 are well known in the art and can provide extremely accurate measurements of the amount of fuel presently within the UST 40. They may be float sensors or pressure sensors or the like, but are sensitive enough to detect minute changes in the present volume of fuel within the UST 40. Most UST sensors 64 are compensated so that the natural expansion and contraction of the fuel according to the vagaries of the atmospheric temperature and pressure are accounted for in the calculation of the volume of fuel present in the UST 40.

Central station computer 66 is communicatively connected to each of the dispensers 10 and 68 as well as the UST sensor 64 and is preferably the G-SITE® sold by the assignee of the present invention. Further, central station computer 66 may be connected to each pump 42 and motor 44 within the fueling environment 60. Thus, central station computer 66 is suited for use in the fraud detection schemes of the present invention. Further, the fueling environments 60 may interconnected one to another and to a corporate headquarters or regional office as seen in FIG. 3.

Figure 3:
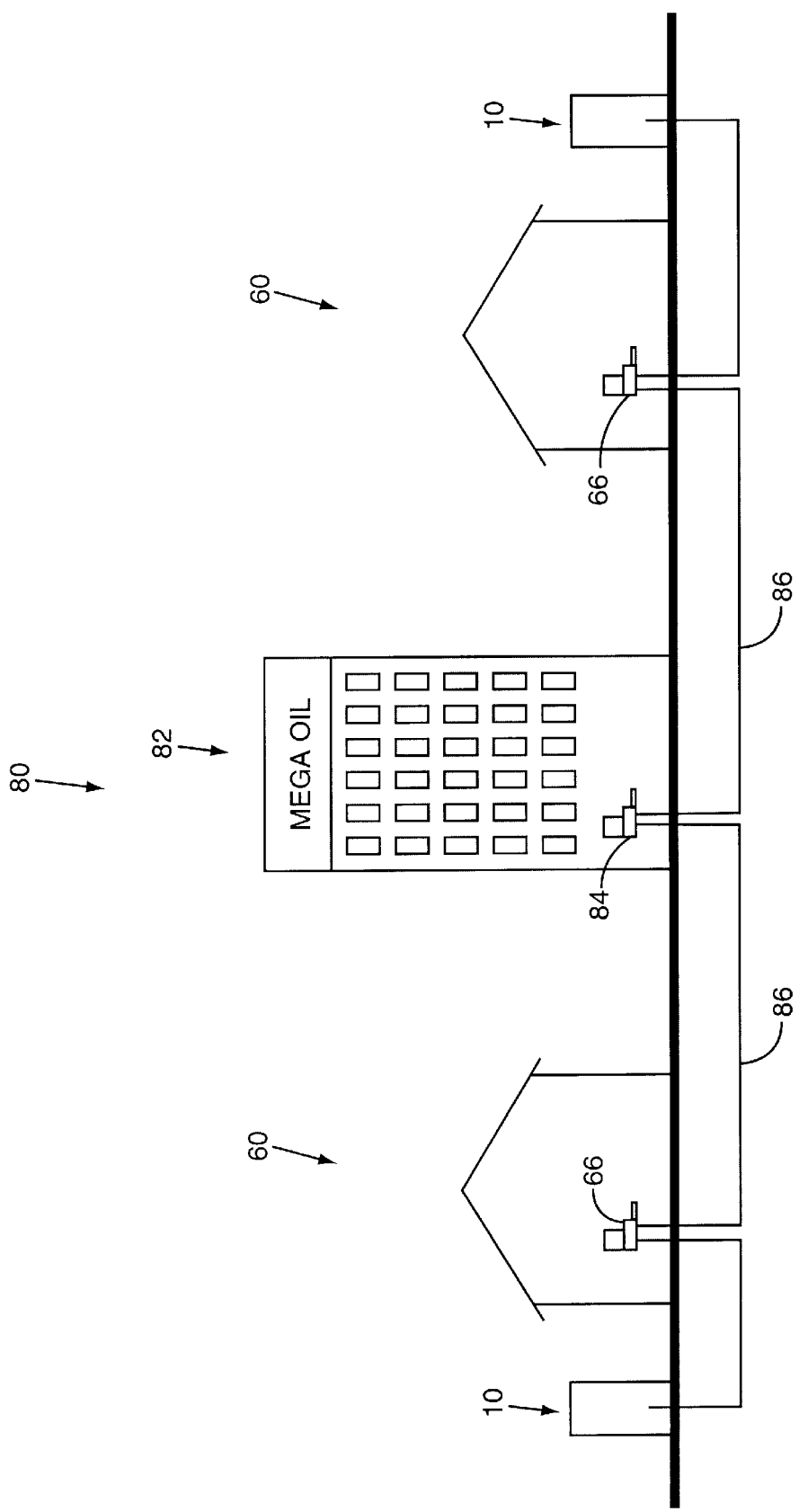
FIG. 3 is a schematic drawing of a plurality of fueling stations connected to a central fraud detection computer.

Specifically, FIG. 3 represents a network 80 that includes a plurality of fueling environments 60, each with a plurality of fuel dispensers 10 and a central station computer 66, as well as a central office 82 that includes a central corporate computer 84. Computers 66 and 84 may be connected by the Internet or other dedicated network 86, such as a wide area network (WAN) as needed or desired. Central office 82 may be a regional office responsible for fraud detection in a geographic region or a national office responsible for fraud detection throughout the nation. While labeled a corporate computer 84, it should be appreciated that a franchisee who owns multiple fueling environments 60 could implement the fraud detection system of the present invention at a central office without having more than a nominal corporate nature. Other computers in communication with multiple fueling environments 60 are also intended to be included within the scope of the term "corporate computer" even if they are not tied to a corporate entity. Computers 66 and 84 communicate one to the other as needed or desired and may pass information about fuel dispensers 10 therebetween.

Fraud may be perpetrated in a number of ways in a fueling environment 60. A first type of fraud comprises throttling back the motor 44 and pump 42 while still reporting to the control system 50 that a normal flow rate is passing through the flow meter 56. For example, normally the pump 42 pumps eight gallons of fuel per minute. Meter 56 registers this flow rate and the pulser makes 8000 pulses per minute. Control system 50 receives these 8000 pulses and reports correctly that eight gallons are dispensed per minute. If the motor 44 is throttled back, it may only pump six gallons of fuel per minute, but the pulser 58 still generates 8000 pulses and the control system 50 believes that eight gallons of fuel are dispensed per minute. There may be other ways to modify the flow of fuel delivery while still convincing the control system 50 that a normal fueling rate is occurring.

Alternatively, the pulser 58 could merely be accelerated to generate a greater number of pulses per gallon of fuel that passes through the meter 56. The control system 50 still believes that 1000 pulses is equivalent to one gallon. For example, eight gallons are dispensed per minute, but the pulser 58 generates 10,000 pulses in that minute, and the control system 50 believes that ten gallon of fuel are dispensed per minute.

Note further that the pulser 58 may operate correctly in either situation, but an additional device, which synthesizes the desired, elevated frequency pulse train, may be interposed between the pulser 58 and the control system 50. Alternatively, the pulser 58 could be operating correctly, but how the control system 50 interpreted the output could be modified. There are other fraudulent schemes that exist as well. The present invention, if properly implemented, may detect most or all of these schemes.

Vapor Analysis

Figure 4:
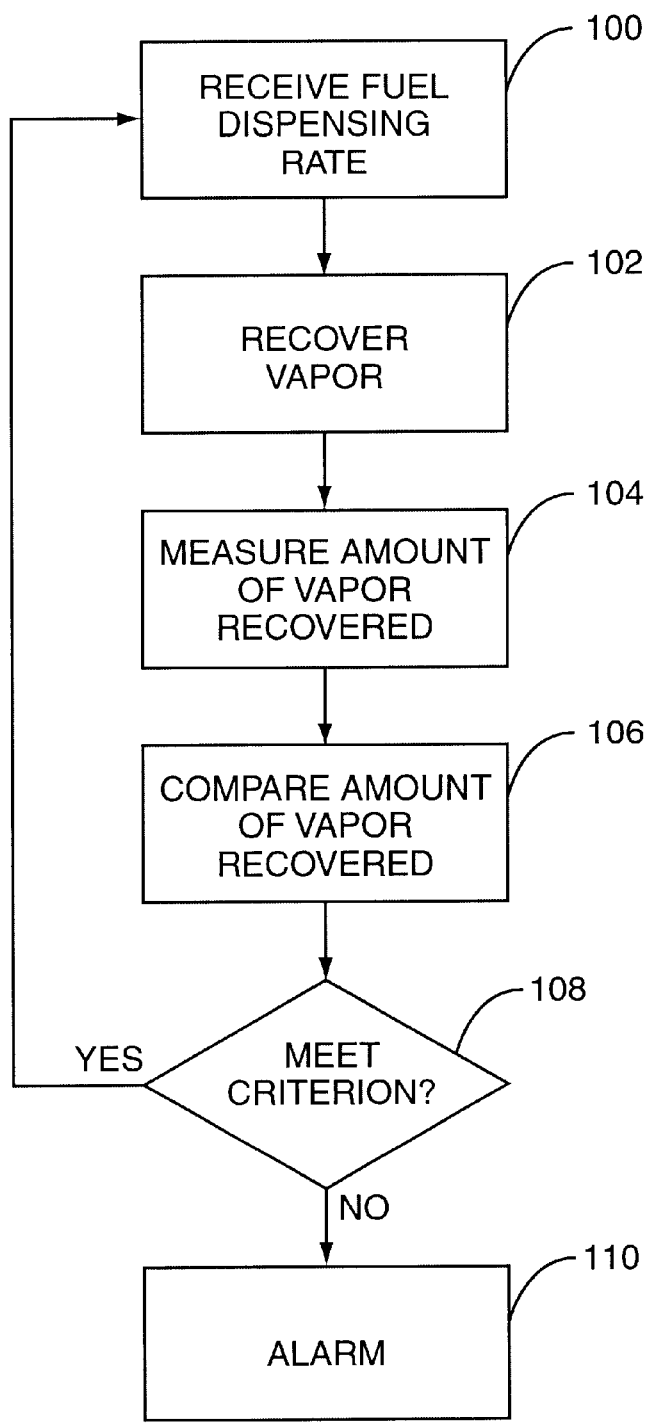
FIG. 4 is a flow diagram of the decisional logic associated with a first fraud detection scheme.

The first fraud detecting scheme is illustrated in FIG. 4 wherein the fuel dispenser 10, and particularly the control system 50 receives a fuel dispensing rate from the meter 56 and pulser 58 (block 100). Simultaneously, the vapor recovery system recovers vapor (block 102). Vapor recovery sensor 54 passes a reading to the control system 50 bearing on the amount of vapor recovered (block 104) from which the control system 50 can determine the volume of hydrocarbon vapor recovered during the fueling transaction. By comparing the volume of hydrocarbons recovered to the amount of fuel allegedly dispensed (block 106), an inference can be made as to the existence of fraud in the system.

In a first aspect of the invention, the control system 50 compares the volume of hydrocarbon vapor recovered to the amount of fuel dispensed (block 106). If the volumes are not comparable, or within a certain allowable range (block 108), then it may be indicative that the fuel dispenser has been modified to produce fraudulent transactions and an alarm may be generated (block 110). This test basically determines that if the fuel dispenser 10 indicates on its display that ten gallons of fuel were dispensed, then an appropriate amount of hydrocarbon vapor should have been recovered. If ten gallons of vapor were recovered, but the concentration or volume of hydrocarbon vapor was too low, that may be indicative that the vapor recovery system is recovering atmospheric vapor, and the actual amount of fuel dispensed was not ten gallons.

In a second aspect of the invention, the control system 50 compares the volumetric rate of hydrocarbon vapor recovery to a historical log of volumetric rate of hydrocarbon vapor recovery (block 106). If the rates are not comparable or meet some predetermined criterion or criteria (block 108) then an alarm may be generated (block 110). This test basically determines that if the fuel dispenser 10 indicates that ten gallons of fuel were dispensed, and historically that meant that ten gallons of hydrocarbon vapor were recovered, but that now only eight gallons of hydrocarbon vapor were recovered, that may be indicative that the fuel dispenser 10 has been modified to perpetrate fraud.

In a third aspect of the invention, the control system 50 compares the rate of vapor recovery from the beginning of the fueling transaction to the end of the fueling transaction (block 106). If the rate dips, or otherwise changes for an inexplicable reason then block 108 is answered negatively, and an alarm may be generated (block 110). This test basically determines that if the fuel dispenser 10 was recovering one gallon of hydrocarbon vapor per ten seconds during the first part of the transaction, but later is recovering eight tenths of a gallon of hydrocarbon vapor per ten seconds that there may be a fraudulent transaction occurring. Note that an upward increase could likewise cause an alarm.

In a fourth aspect of the invention, the central station computer 66 may compare the rate of vapor recovery to rates of vapor recovery to other fuel dispensers 10 at the fueling environment 60 (block 106). If the rates are not comparable (block 108), then the computer 66 may infer that there is fraud and generate an alarm (block 110). This test basically compares the volumetric rate of hydrocarbon vapor recovery between multiple fuel dispensers 10. If one fuel dispenser 10 is recovering hydrocarbon vapor more or less efficiently than the other fuel dispensers 10, then it may have been modified into a fraudulent dispenser 68.

In a fifth aspect of the invention, the corporate computer 84 may compare the rate of hydrocarbon vapor recovery from a particular fueling environment 60, and perhaps a particular fuel dispenser 10 to a regional or national average hydrocarbon vapor recovery rate as determined by averaging hydrocarbon vapor recovery rates from any number of or all fuel environments 60 communicatively coupled to the corporate computer 84 (block 106). It should be appreciated that the average need not be a true average per se, it can be any acceptable statistical model that is representative of a typical hydrocarbon vapor recovery rate. If the measured vapor recovery rate does not meet a predetermined criteria (block 108), then an alarm may be generated (block 110). This is similar to the fourth aspect, but has a broader base to catch fraudulent dispensers 68. Whereas the fourth aspect may not catch a fraudulent dispenser 68 if all dispensers 10 have been modified, the fifth aspect probably would catch a fueling environment 60 that had been completely modified to perpetrate fraud.

Further note that regardless of how the fraud was perpetrated, this method is useful in fraud detection unless the fraud feasor also modified the vapor recovery system. Note also that this technique is well suited for catching consumer perpetrated fraud as well in that as long as the vapor readings and the reported amount of fuel dispensed readings are not within tolerable limits, an alarm may be generated indicating fraud.

Flow Rate Analysis

Figure 5:
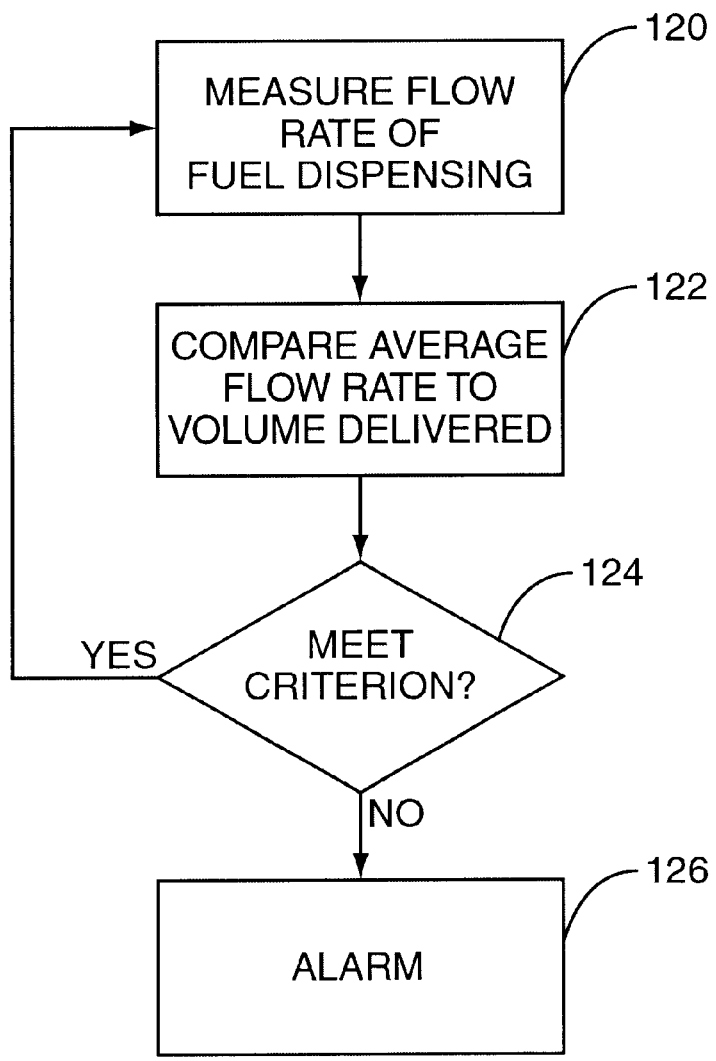
FIG. 5 is a flow diagram of the decisional logic associated with a second fraud detection scheme.

A second embodiment is seen in FIG. 5 wherein the flow rate of the fuel being dispensed is compared to an expected flow rate. If the pump 42 has been throttled back, and the pulser 58 providing inaccurate data to the control system 50, then the rate per gallon as reported by the pump 42 or motor 44 on average for non-fraudulent transactions should be significantly higher than the flow rate exhibited during fraudulent sales. For example, if a non-fraudulent fuel sale of ten gallons is delivered at an average of eight gallons per minute, a fraudulent fuel sale of eight gallons (but presented to the consumer as ten gallons) should exhibit a markedly lower average flow rate, perhaps six gallons per minute as reported by the pump 42. If however, the pulser 58 has been accelerated without modification to pump 42, then the control system will show a flow rate that is much higher than the actual flow rate as well as one that appears faster than normal non-fraudulent sales.

In a first aspect of this embodiment, the fuel dispenser 10, and particularly the meter 56, reports to the control system 50 a measured flow rate of the fuel presently being dispensed (block 120). Control system 50 compares the reported flow rate to a historical flow rate established by the fuel dispenser 10 (block 122). If the flow rate fails to meet some criterion or criteria (block 124) then an alarm may be generated (block 126). Note that for a given fuel dispenser 10, the average flow rate should remain relatively constant from transaction to transaction, thus the historical data would have to be established before any tampering to be effective. This could be done during factory calibration or immediately after installation to reduce the risk of the historical data being fraudulent from the outset. However, if the historical data is accurate, any change or deviation therefrom may be indicative of tampering.

In a second aspect of this embodiment, the fuel dispenser 10 measures the flow rate of the fuel presently being dispensed (block 120). This is reported to the central station computer 66, which then compares the reported flow to an average flow rate for all the fuel dispensers 10 within the fueling environment 60 (block 122). If the flow rate fails to meet some criterion or criteria (block 124) then an alarm may be generated (block 126). This aspect is effective when only a few of the fuel dispensers 68 have been corrupted within a given fueling environment 60. These fuel dispensers 68 will show different average fueling rates from the fuel dispensers 10 which have not been corrupted, and the appropriate alarm may be generated.

In a third aspect of this embodiment, each fuel dispenser 10 measures an average flow rate of fuel presently being dispensed (block 120) and reports to the central station computer 66. Central station computer 66 periodically reports the average flow rates for each fuel dispenser 10 within the fueling environment 60 to the central corporate computer 84. Corporate computer 84 then compares the reported average flow rates to an average established by some or all of the fuel dispensers 10 that provide reports to the computer 84, either directly or indirectly. This aspect is particularly useful in catching fueling environments 60 in which every fuel dispenser 68 has been corrupted. To reduce the load on the network 86, the average fueling rates may be reported periodically rather than during every fueling transaction. This should be automated and have as little chance as possible for human intervention, otherwise, data tampering may occur, reducing the likelihood that the fraud is detected.

In a fourth aspect of this embodiment, the average flow rate is compared to a maximum allowable flow rate of which the fuel dispenser 10 is capable. For example, some fuel dispensers 10 have a maximum flow rate of ten gallons per minute. If the fuel dispenser 10 indicates that it is delivering twelve gallons per minute, it is likely that the fuel dispenser 10 has been corrupted or modified.

In a fifth aspect of this embodiment, pump 42 or motor 44 reports to the control system 50 at what rate fuel is being removed from the UST 40 to provide the flow rate of the fuel being dispensed (block 120). This value is compared to the amount the control system 50 believes is being dispensed (block 122). Control system 50 determines if the values compared meet some predetermined criterion or criteria (block 124). If they do not, an alarm may be generated (block 126).

In a sixth aspect of this embodiment, the pump 42 or the motor 44 reports the speed at which fuel is being removed from the UST 40 to the central station computer 66 (block 120). Central station computer 66 also receives from the control system 50 the amount of fuel that the control system 50 was told had been dispensed. From these two values, the central station computer 66 can make the desired comparison (block 122). If the two values are not comparable or otherwise fail to meet some predetermined criterion or criteria (block 124) an alarm may be generated (block 126).

In a seventh aspect of this embodiment, the pump 42 or the motor 44 reports the speed at which fuel is being removed from the UST 40 to the corporate computer 84 (block 120), which makes the comparison (block 122) and generates an alarm (block 126) if some criterion or criteria are not met (block 124).

In an eighth aspect of this embodiment, the pump 42 or the motor 44 reports the speed at which fuel is being removed from the UST 40 to the central station computer 66 (block 120). Central station computer 66 compares the rate of fuel flow at that particular dispenser 10 to the average fuel flow rates at other dispensers 10 within the fueling environment 60 (block 122). If the flow rate in question does not meet some predetermined criterion or criteria (block 124) then an alarm may be generated (block 126).

In a ninth aspect of this embodiment, the pump 42 or the motor 44 reports the speed at which fuel is being removed from the UST 40 to the corporate computer 84 (block 120). Corporate computer 84 compares the flow rate to an average flow rate as established by the flow rates reported from a plurality of fueling environments 60 (block 122). If the measured value does not meet some predetermined criterion or criteria (block 124) an alarm may be generated.

In a tenth aspect of this embodiment, the central station computer 66 generates an average measured flow rate from the various pumps 42 or motors 44 within the fueling environment (block 120) and reports this average to the corporate computer 84. Corporate computer 84 then compares the average flow rate for a particular fueling environment against an average flow rate for comparably situated fueling environments (block 122). If the reported average flow rate does not meet some predetermined criterion or criteria (block 124) an alarm may be generated.

In an eleventh aspect of the present invention, the flow rate of the dispenser 10 is measured and compared to other flow rates measured during the same fueling transaction. If the flow rates vary past certain allowable parameters within a single transaction, this may be indicative of fraud, and an alarm may be generated. The comparison can be done by the control system 50, the central station computer 66, or even the corporate computer 84 as needed or desired.

Note that for the analysis to be the most probative, the make and model of the fuel dispensers 10 being compared are preferably the same. It may be meaningless to compare model X to model Y if they are designed to have different fueling rates. However, different models may be designed to have identical fueling rates and in such a circumstance, the comparison may still be probative.

Time Required Analysis

Figure 6:
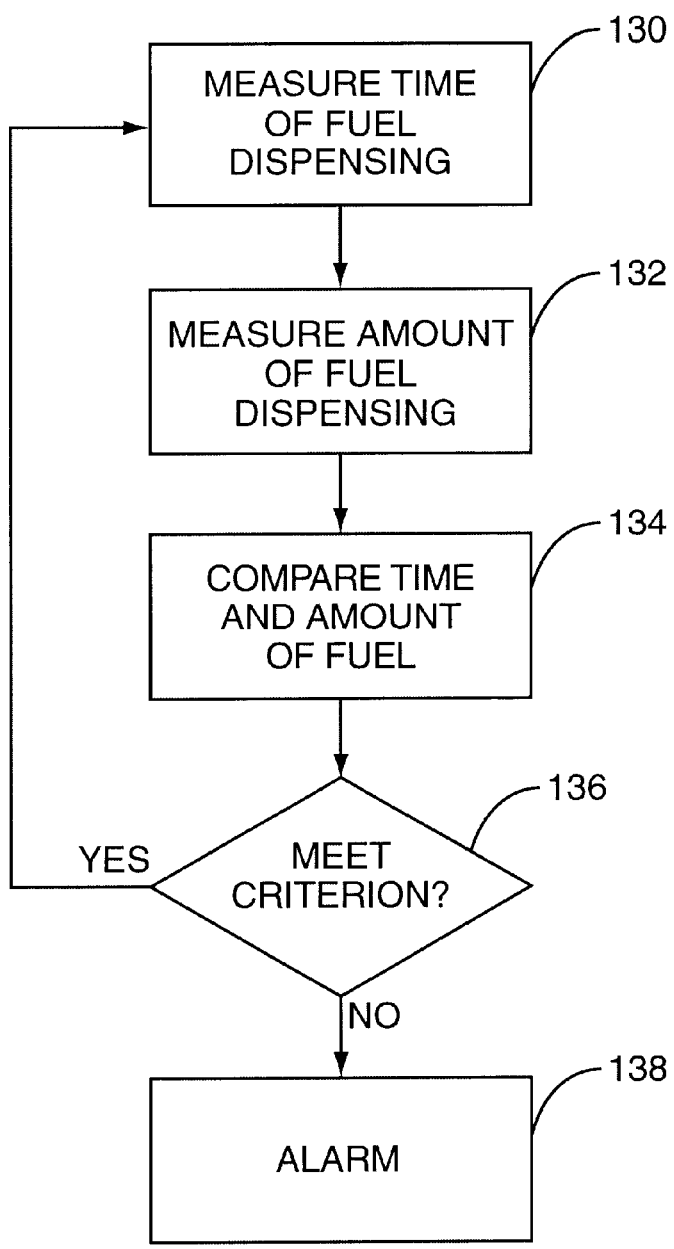
FIG. 6 is a flow diagram of the decisional logic associated with a third fraud detection scheme.

A third embodiment is seen in FIG. 6 and is closely related to the second embodiment. However, in contrast to the second embodiment, the total time required for the fueling transaction is measured and compared to times required for similar fueling transactions.

A first aspect of this embodiment measures the time required for the fueling transaction (block 130). Control system 50 and an internal timer or the like may accomplish this measurement. At the same time, the meter 56 and the pulser 58 provide a measurement of the amount of fuel dispensed to the control system 50 (block 132). Control system 50 then compares the amount of time required to dispense the measured amount of fuel to a historical collection of data (block 134). If the measured values fail to meet some criterion or criteria (block 136) an alarm may be generated (block 138). For example, the fuel dispenser 10 may know that it should take seventy-two seconds to dispense twelve gallons based on the historical data. If the present fuel transaction purports to dispense twelve gallons in sixty seconds, then there is an indication of fraud.

A second aspect of this embodiment has an external time measuring device 70, such as a camera with a timer (FIG. 2)

measure the time required for a fueling transaction (block 130). The control system 50 still gathers a measurement indicative of the amount of fuel allegedly dispensed (block 132), i.e. the reported amount. The central station computer 66 then compares the time required to the fuel dispensed (block 134). If the results do not meet some predetermined criterion (block 136), an alarm may be generated (block 138). This requires the fraudulent actor to modify not only the fuel dispenser 68, but also the time measuring device 70 if he is going to perpetrate the fraud, increasing the likelihood of observation or detection. Note also that the time measuring device 70 could report directly to the control system 50, and control system 50 perform the comparison.

A third aspect of this embodiment uses the central station computer 66 to provide the ability to measure the time required to complete a fueling transaction (block 130). Fuel dispenser 10, and specifically control system 50, measures the amount of fuel allegedly dispensed (block 132). The central station computer 66 compares the time required to the fuel dispensed (block 134). If the results do not meet some predetermined criterion (block 136), an alarm may be generated (block 138). Again, this requires modifications at two locations for the fraudulent actor, thereby increasing the likelihood of apprehension.

A fourth aspect would be identical to the third aspect, but the corporate computer 84 would provide the time measuring function. This is not preferred because of the computational requirements placed on the corporate computer 84 and the loads placed on the network 86, but it could be implemented if desired.

A fifth aspect of this embodiment has the central station computer 66 collect and average the time required for fueling transactions (block 130) as well as the average amount of fuel dispensed (block 132) and pass this to the corporate computer 84. The corporate computer 84 compares these averages to predetermined averages (block 134) for these activities. If the reported values do not meet some predetermined criterion or criteria (block 136) an alarm may be generated (block 138).

This third embodiment is essentially a modification of the average fueling rate embodiment in that a number of gallons delivered are being compared with a time required. However, the actual data that is being compared is slightly different—instead of an average fueling rate, two data points are being compared. The end result is the same, but the implementation may be different.

Tank Monitor

Figure 7:
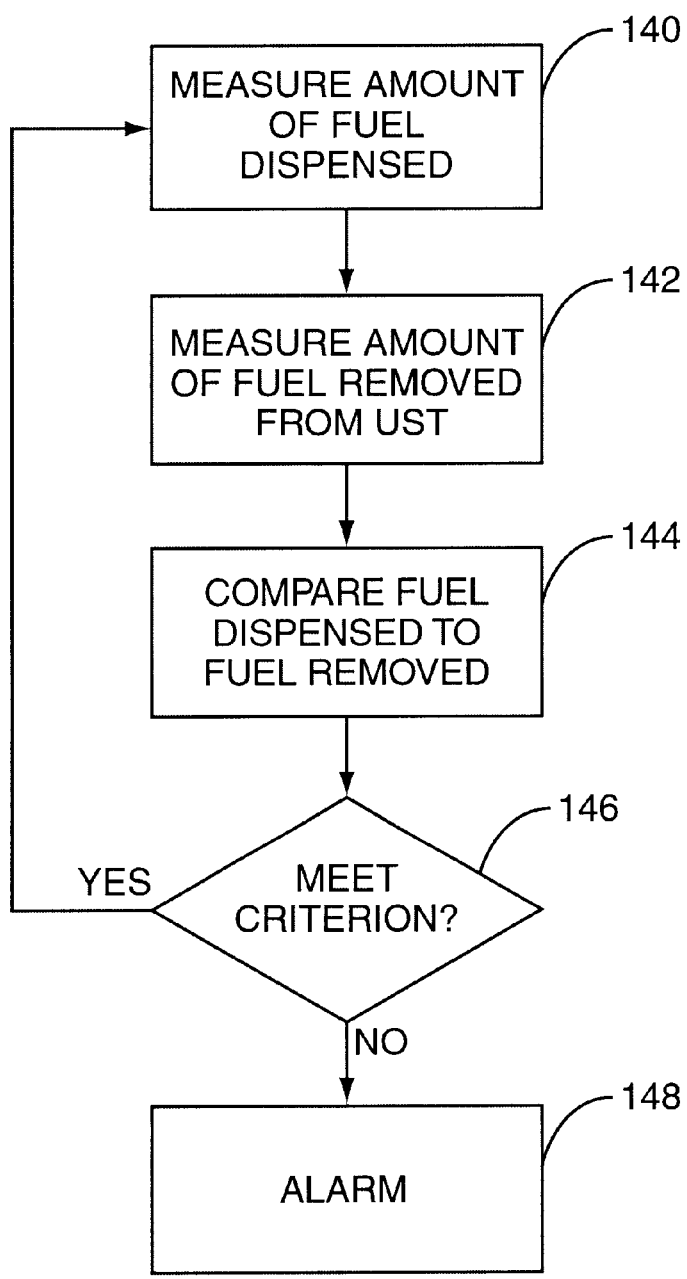
FIG. 7 is a flow diagram of the decisional logic associated with a fourth fraud detection scheme.

A fourth embodiment is seen in FIG. 7. This particular embodiment compares the amount of fuel that the fuel dispenser 10 indicates that it dispensed to the amount of fuel removed from the UST 40. Note that this embodiment functions best when only one fuel dispenser 10 is draining fuel from UST 40 at a time, and thus it may be difficult to isolate each dispenser 10 under such conditions. However, over a period of time, statistically, such isolated fueling events should occur, providing the fraud detection desired. Alternatively, the station owner/operator or the corporate fraud control agent can periodically perform the tests in controlled situations.

In a first aspect of this embodiment, the meter 56 and pulser 58 provide a measurement of the amount of fuel dispensed to the control system 50 (block 140). Sensor 64 measures the amount of fuel removed from the UST 40 (block 142) and provides this measurement to the control system 50. Control system 50 then compares the amount of fuel dispensed to the amount of fuel removed (block 144). If the comparison does not meet some predetermined criterion or criteria (block 146) then an alarm may be generated (block 148).

In a second aspect of this embodiment, the meter 56 and pulser 58 provide a measurement of the amount of fuel dispensed to the central station computer 66 (block 140). Sensor 64 provides a measurement of the amount of fuel removed from UST 40 to the central station computer 66 (block 142). Central station computer 66 then compares the amount of fuel dispensed to the amount of fuel removed (block 144). If the comparison does not meet some predetermined criterion (block 146) then an alarm may be generated (block 148).

In a third aspect of this embodiment, the measurements of blocks 140 and 142 could be provided to the corporate computer 84 and the comparison performed remotely from the fueling environment 60.

In a fourth aspect of this embodiment, the central computer station 66 could collect an average sensor 64 reading per transaction to the corporate computer 84 (block 142) and the corporate computer 84 could then perform the comparison (block 144). If the station average did not meet some predetermined criterion or criteria (block 146) then an alarm could be generated.

Sensor 64 is sensitive enough that even the occurrence of a single "short deliver" of 20% may be detectable for a ten or fifteen gallon delivery. Additionally, while it is preferred that this comparison occur during times when only a single fuel dispenser 10 is draining fuel from UST 40, it is possible to attempt the comparison when two or more fuel dispensers are operating. The fact that an anomalous result occurs indicates that one or more of the fuel dispensers 10 that drained fuel from UST 40 when the anomalous result occurred are potentially fraudulent. Repeated events could isolate the questionable fuel dispenser 68, or the anomalous result may trigger a manual inspection of the various fuel dispensers 10 until the problem is located.

Compare to Known Fraudulent Data

This embodiment is somewhat akin to any and all of the above embodiments. However, instead of comparing the reported values to a known acceptable value, the reported values could be compared to a known fraudulent value. Thus, all of the above processes could be repeated, but in the comparison to the predetermined reference, the predetermined reference would be a known fraudulent data point. If the two values were identical or within some predetermined confidence interval, an alarm could be generated indicating that the tested dispenser 68 was fraudulent, the tested fueling environment 60 was fraudulent or the like, depending on exactly what had been tested.

It should be noted that these solutions are not mutually exclusive, a plurality of such solutions could be implemented. Different aspects of the same embodiment could be implemented simultaneously or different embodiments could be combined to greatly increase the likelihood that fraud is detected and corrected. This will increase consumer confidence and protect the goodwill of the companies responsible for selling fuel from the illegal activities of rogue franchisees. Further, while the tests enunciated above speak in terms of the measured values not meeting some predetermined criterion or criteria, it should be appreciated that the converse is true. Instead of failing a test which indicates that the fuel dispenser 10 is normal, an alarm could be generated when the fuel dispenser 10 passes a test that indicates fraud. Both are equivalent and effectively report the same information, but are phrased slightly differently and perhaps implemented differently.

Additionally, as would be expected when decisional logic is executed by a computer or the like, the particular implementations may be implemented through software or dedicated memory containing hard wired instructions on how to perform the desired tasks.

Further, a failure to report data to a corporate computer 84 may also be indicative of fraud. In such an instance, an alarm should be generated and the station operator interrogated as to why the data was not provided as required. Alternatively, an independent, manual test could be performed at the station unbeknownst to the station operator to confirm that fraudulent activity is taking place before any questions are asked.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of detecting fraud in a fuel dispenser, wherein the fraud comprises reporting an amount of fuel in excess of the amount of fuel actually dispensed in a fueling transaction, said method comprising:
   a) reporting an amount of fuel alleged to be dispensed on the fuel dispenser to create a reported amount;
   b) comparing the reported amount to a reference; and
   c) determining if the reported amount is within confidence interval of said reference to estimate a likelihood that the reported amount exceeds the amount of fuel actually dispensed.

2. The method of claim 1 wherein the step of comparing the reported amount to a reference is performed by the fuel dispenser.

3. The method of claim 1 wherein the step of comparing the reported amount to a reference comprises that fuel dispenser comparing the reported amount to historically created data.

4. The method of claim 1 wherein the step of comparing the reported amount to a reference is performed remotely from the fuel dispenser.

5. The method of claim 1 wherein the step of comparing the reported amount to a reference comprising comparing the reported amount to historically created data remotely from the fuel dispenser.

6. The method of claim 1 wherein the step of comparing the reported amount to a reference comprising comparing the reported amount to historically created data.

7. The method of claim 6 wherein said historically created data is created by averaging data relating to a plurality of fueling transactions.

8. The method of claim 1 wherein the step of comparing the reported amount to a reference is performed by a central station computer.

9. The method of claim 1 wherein the step of comparing the reported amount to a reference is performed by a computer remote from a fueling environment in which the fuel dispenser is located.

10. The method of claim 1 wherein said reference is created from data relating to a plurality of fuel dispensers.

11. The method of claim 1 wherein said reference is created from data relating to a plurality of fuel dispensers at a plurality of fueling enviroments.

12. The method of claim 1 wherein said reference is generated from data garnered from a source remote from the fuel dispenser.

13. The method of claim 1 wherein said reference is created from data garnered from at least a second fuel dispenser remote from the fuel dispenser.

14. The method of claim 1 further comprising making a plurality of comparisons during a single fueling transaction between the reported amount and a plurality of updated references, individual ones of said plurality of updated references derived at a time prior to a respective one of said plurality of comparisons.

15. The method of claim 1 further comprising generating an alarm if said reported amount is within said confidence interval.

16. The method of claim 1 further comprising generating an alarm if said reported amount lies without said confidence interval.

17. The method of claim 1 further comprising generating an alarm if the step of comparing fails to be performed due to a failure to report the reference.

18. The method of claim 1 wherein the step of comparing the reported amount to a reference comprises comparing the reported amount to a reference generated from an analysis of the time required to complete the transaction.

19. The method of claim 1 wherein the step of comparing the reported amount to a reference comprises comparing the reported amount to a reference generated from an analysis of vapor recovered during the fueling transaction.

20. The method of claim 1 wherein the step of comparing the reported amount to a reference comprises comparing the reported amount to a reference generated from an analysis of an output form a storage tank sensor during the fueling transaction.

21. The method of claim 1 wherein the step of comparing the reported amount to a reference comprises comparing the reported amount to a reference generated from an analysis of a flow rate within the fuel dispenser during the fueling transaction.

22. The method of claim 1 wherein the step of comparing the reported amount to a reference comprises comparing the reported amount to a reference generated from at least one source selected from the group comprising:
   an analysis of vapor recovered during the fueling transaction;
   an analysis of an output from a storage tank sensor during the fueling transaction;
   an analysis of a flow rate within the fuel dispenser during the fueling transaction; and
   an analysis of the time required to complete the transaction.

23. The method of claim 1 wherein the step of comparing the reported amount to a reference is performed by at least one location selected from the group comprising:
   the fuel dispenser;
   a central station computer; and
   a computer remote from a fueling enviroment in which the fuel dispenser is located.

24. The method of claim 1 wherein the step of comparing the reported amount to a reference comprises comparing the reported amount to a reference generated from an analysis of a parameter generated during a known fraudulent transaction.

25. A computer readable medium containing software configured to perform the method of claim 1.

26. A method of detecting fraud in a fueling environment, wherein the fraud comprises reporting on a fuel dispenser an amount of fuel in excess of the amount of fuel actually dispensed in a fueling transaction, said method comprising:
   a) averaging reported amounts for plurality of fueling transaction occurring in the fueling environment;
   b) reporting an average reported amount to a computer remote from the fueling environment;

c) comparing the average reported amount to a reference; and d) determining if the average reported amount is within a confidence interval of said reference to estimate a likelihood that the average reported amounts exceed an average amount of fuel actually dispensed.

27. The method of claim 26 wherein the step of comparing the average reported amount to a reference comprises calculating said reference by analyzing an average amount of vapor recovered during a plurality of fueling transactions.

28. The method of claim 26 wherein the step of comparing the average reported amount to a reference comprises calculating said reference by analyzing an average output from a storage tank sensor during a plurality of fueling transactions.

29. The method of claim 26 wherein the step of comparing the average reported amount to a reference comprises calculating said reference by analyzing an average flow rate during a plurality of fueling transactions.

30. The method of claim 26 wherein the step of comparing the average reported amount to a reference comprises calculating said reference by analyzing an average time required to complete a plurality of fueling transactions.

31. The method of claim 26 wherein the step of comparing the average reported amount to a reference comprises calculating said reference from at least one source selected from the group comprising:

an analysis of vapor recovered during the fueling transaction;

an analysis of an output from a storage tank sensor during the fueling transaction;

an analysis of a flow rate within the fuel dispenser during the fueling transaction; and an analysis of the time required to complete the transaction.

32. The method of claim 26 wherein the step of comparing the average reported amount to a reference is performed by a computer remote from the fueling environment.

33. The method of claim 26 wherein the step of comparing the average reported amount to a reference comprises calculating the reference from historically created data.

34. The method of claim 33 wherein calculating the reference comprises collating data from a plurality of fueling environments, each including at least one fuel dispenser.

35. The method of claim 26 further comprising generating an alarm if the fueling environment fails to report the average reported amount.

36. A computer readable medium containing software configured to perform the method of claim 26.

37. A fuel dispenser configured to detect fraud in a fueling transaction wherein the fraud comprises reporting an amount of fuel exceeding the amount of fuel actually dispensed in a fueling transaction, said fuel dispenser comprising:

a) a fuel delivery path to deliver fuel to vehicle;

b) a user interface for reporting an amount of fuel allegedly dispensed; and c) a control system for controlling said fuel delivery path, wherein said control system determines a reference and compares said reference to a reported amount of fuel alleged to be dispensed through the fuel delivery path during the fueling transaction and wherein said control system determines if the reported amount is within a confidence interval of said reference to estimate a likelihood that the reported amount exceeds the amount of fuel actually dispensed.

38. The fuel dispenser of claim 37 wherein said reference is calculated from at least one source selected from the group comprising:

an analysis of vapor recovered during the fueling transaction;

an analysis of an output from a storage tank sensor during the fueling transaction;

an analysis of a flow rate within the fuel dispenser during the fueling transaction; and an analysis of the time required to complete the transaction.

39. The fuel dispenser of claim 38 wherein said reference is calculated by said control system.

40. The fuel dispenser of claim 38 wherein said reference is calculated at a location remote from said fuel dispenser.

41. The fuel dispenser of claim 38 wherein said reference is calculated from historically created data.

42. The fuel dispenser of claim 41 wherein said historically created date is accumulated over a plurality of fueling transactions.

43. The fuel dispenser of claim 37 wherein said control system makes a plurality of comparisons during a single fueling transaction between concurrently reported amount of fuel dispensed and a reference.

44. The fuel dispenser of claim 37 wherein said control system is configured to pass the data to a central station computer.

45. The fuel dispenser of claim 37 wherein said control system is configured to pass the data to a computer remote from the fuel dispenser.

46. A central station computer configured to detect fraud in a fueling transaction wherein the fraud comprises reporting an amount of fuel exceeding the amount of fuel actually dispensed in a fueling transaction, said central station computer computer configured to:

receive a reported amount of fuel alleged to be dispensed on a fuel dispenser;

compare the reported amount to a reference; and determine if the reported amount is within a confidence interval of said reference to estimate a likelihood that the reported amount differs from an amount of fuel actually dispensed.

47. The central station computer of claim 46 wherein said reference is calculated from at least one source selected from the group comprising:

an analysis of vapor recovered during the fueling transaction;

an analysis of an output from a storage tank sensor during the fueling transaction;

an analysis of a flow rate within the fuel dispenser during the fueling transaction; and an analysis of the time required to complete the transaction.

48. The central station computer of claim 46 wherein said computer is further configured to generate said reference from a plurality of fuel dispensers.

49. The central station computer of claim 46 wherein said computer is further configured to perform a plurality of comparisons during a single fueling transaction.

50. The central station computer of claim 46 wherein said reference is determined with historically created data generated by the fuel dispenser.

51. The central station computer of claim 46 wherein said reference is determined with data generated remotely from the fuel dispenser.

52. A system comprising a computer remote from a fueling environment configured to detect fraud in a fuel dispenser wherein the fraud comprises reporting an amount of fuel differing from the amount of fuel actually dispensed in a fueling transaction, said computer configured to:

received data related to a reported amount of fuel alleged to be dispensed on a fuel dispenser;

compare the data related to a reported amount to a reference; and determine if the data related to the reported amount is within a confidence interval of said reference to estimate a likelihood that the reported amount differs from the amount of fuel actually dispensed.

53. The system of claim 52 wherein the data related to a reported amount of fuel alleged to be dispensed on a fuel dispenser comprises a fueling environment average.

54. The system of claim 52 wherein the data related to a reported amount of fuel alleged to be dispensed on a fuel dispenser comprises an average reported amount from a single fuel dispenser accumulated over a plurality of fueling transaction.

55. The system of claim 52 wherein said reference is determined by comparing data from a plurality of fueling environments.

56. The system of claim 52 wherein said computer is configured to generate an alarm if said computer fails to receive the data.

57. A computer readable medium comprising software to detect fraud in a fueling transaction, wherein the fraud comprises reporting on a fuel dispenser an amount of fuel is excess of the amount of fuel actually dispensed in a fueling transaction, said software configured to:

report an amount of fuel alleged to be dispensed on the fuel dispenser to create a reported amount;

compare the reported amount to a reference; and determine if the reported amount is within a confidence interval of said reference to estimate a likelihood that the reported amount exceeds an amount of fuel actually dispensed.

58. A computer readable medium comprising software to detect fraud in fueling transactions, wherein the fraud comprises reporting on fuel dispensers an amount of fuel in excess of an amount of fuel actually dispensed in a particular fueling transaction, said software configured to:

averager reported amounts for a plurality of fueling transactions occurring in the fueling environment;

report an average reported amount to a computer remote from the fueling environment;

compare the average reported amount to a reference; and determine if the average reported amount are within a confidence interval of said reference to estimate a likelihood that the average reported amount exceed an average amount of fuel actually dispensed.

* * * * *